(12) United States Patent
Stieger et al.

(10) Patent No.: US 10,167,084 B2
(45) Date of Patent: Jan. 1, 2019

(54) AIRCRAFT ENVIRONMENTAL CONTROL SYSTEM AIR DUCT ARRANGEMENT

(71) Applicant: ROLLS-ROYCE PLC, London (GB)

(72) Inventors: Rory D Stieger, Derby (GB); Lorenzo Raffaelli, Sheffield (GB)

(73) Assignee: ROLLS-ROYCE plc, London (GB)

( * ) Notice: Subject to any disclaimer, the term of this patent is extended or adjusted under 35 U.S.C. 154(b) by 542 days.

(21) Appl. No.: 14/830,143

(22) Filed: Aug. 19, 2015

(65) Prior Publication Data
US 2016/0075435 A1 Mar. 17, 2016

(30) Foreign Application Priority Data
Sep. 17, 2014 (GB) .................................. 1416407.3

(51) Int. Cl.
| | | |
|---|---|---|
| B64D 13/08 | (2006.01) | |
| B64D 13/06 | (2006.01) | |
| B64C 21/06 | (2006.01) | |
| B64D 33/02 | (2006.01) | |

(52) U.S. Cl.
CPC .............. B64D 13/08 (2013.01); B64C 21/06 (2013.01); B64D 13/06 (2013.01); *B64D 2013/0603* (2013.01); *B64D 2013/0611* (2013.01); *B64D 2013/0622* (2013.01); *B64D 2033/0213* (2013.01); *Y02T 50/166* (2013.01); *Y02T 50/56* (2013.01)

(58) Field of Classification Search
CPC ................... B64D 13/08; B64D 13/06; B64D 2013/0603; B64D 2013/0611; B64D 2013/0622; B64D 2033/2013; B64C 21/06; Y02T 50/166; Y02T 50/56

USPC ....................................................... 454/71, 76
See application file for complete search history.

(56) References Cited

U.S. PATENT DOCUMENTS

| | | | | |
|---|---|---|---|---|
| 6,651,929 B2 * | 11/2003 | Dionne | .................. | B64D 33/08 |
| | | | | 165/44 |
| 7,624,944 B2 | 12/2009 | Parikh et al. | | |
| 2013/0306024 A1* | 11/2013 | Rolt | ........................ | B64C 21/06 |
| | | | | 123/198 R |

FOREIGN PATENT DOCUMENTS

| | | |
|---|---|---|
| EP | 0517459 A1 | 12/1992 |
| EP | 1433703 A1 | 6/2004 |
| EP | 1440004 A1 | 7/2004 |
| EP | 1916185 A2 | 4/2008 |
| GB | 612796 A | 11/1948 |

(Continued)

OTHER PUBLICATIONS

Jan. 29, 2016 Search Report issued in European Patent Application No. 15181584.

(Continued)

*Primary Examiner* — Gregory Huson
*Assistant Examiner* — Dana Tighe
(74) *Attorney, Agent, or Firm* — Oliff PLC (57) ABSTRACT

An air duct arrangement (58) for an aircraft (40). The arrangement (58) comprises an environmental control system (ECS) (50). The ECS (50) comprises an air inlet (60) arranged to ingest a low velocity portion of a boundary layer flow adjacent the aircraft fuselage (44), and to deliver a flow of air to an environmental control system air intake (66). The arrangement (58) further comprises an ejector (70) arranged to receive an ECS exhaust (76), and boundary layer air from an aft region of the aircraft (40), and to exhaust air to the ambient airstream at an aft portion of the aircraft (40).

14 Claims, 5 Drawing Sheets

(56) References Cited

FOREIGN PATENT DOCUMENTS

GB      2247510 A       3/1992
WO      03/037715 A1    5/2003

OTHER PUBLICATIONS

Mar. 13, 2015 Search Report issued in British Patent Application No. 1416407.3.
Plas, A.P., et al. "Performance of a Boundary Layer Ingesting (BLI) Propulsion System". 45th AIAA Aerospace Sciences Meeting and Exhibit, Jan. 8-11, 2007, Reno, Nevada.

\* cited by examiner

AIRCRAFT ENVIRONMENTAL CONTROL SYSTEM AIR DUCT ARRANGEMENT

FIELD OF THE INVENTION

The present invention relates to an air duct arrangement for an aircraft.

BACKGROUND TO THE INVENTION

Figure 1:
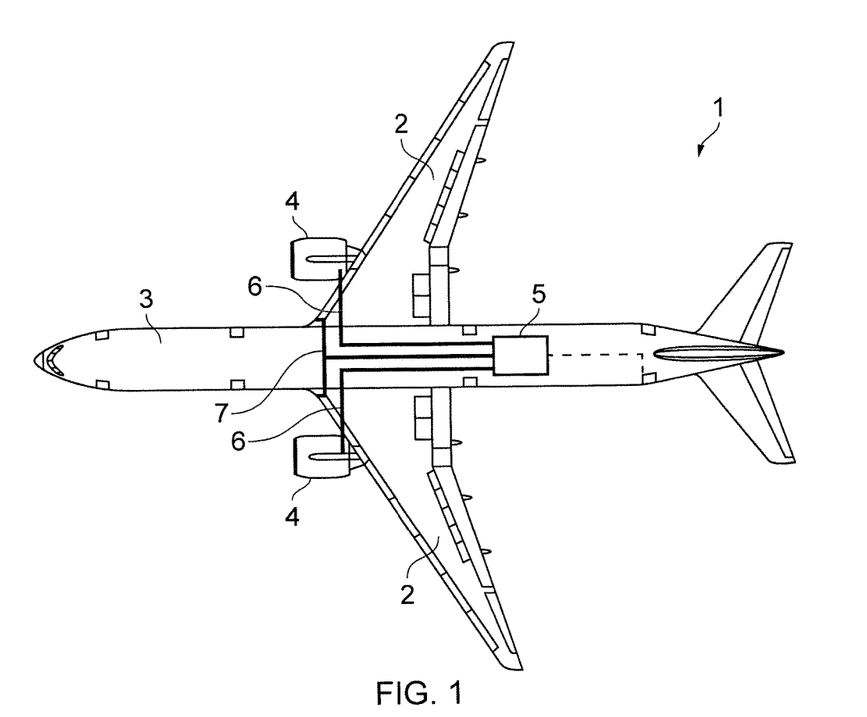
FIG. 1 shows a schematic plan view of a prior aircraft.

FIG. 1 shows a conventional aircraft 1 having wings 2 attached to a fuselage 3, and engines in the form of a pair of gas turbine engines 4 mounted to the wings 2.

The aircraft 1 includes an environmental control system (ECS) 5. The ECS 5 provides pressurised, temperature controlled air to the aircraft cabin to aid passenger comfort, particularly at high altitude.

The ECS system 5 is a "bleedless" system, in which air is provided from a separate ECS compressor. The ECS compressor could be powered by an electrical motor for example, which is in turn powered by electricity generated by engine driven electrical generators. Alternatively, the ECS compressor could be driven by a separate prime mover, such as an Auxiliary Power Unit (APU) of the aircraft, or a dedicated prime mover. The pressure, flow rate and temperature of the air from the ECS compressor air is controlled using an air-cycle machine, and by cooling the compressed air with ambient air via a heat exchanger. This air is then delivered to the cabin, before being exhausted overboard once used through an exhaust port into the ambient airstream. The ambient air for the heat exchanger and the inlet air for the ECS compressor are drawn in from an intake duct 7.

Conventional ambient air intake ducts for ECS systems are located at the wing root of the aircraft where the fuselage 3 and leading edge of the wings 2 meet. This location has a high stagnation pressure, which results in a high pressure head being available to drive the ambient air through the heat exchanger and compressor inlet. U.S. Pat. No. 7,624,944 and EP1916185 each describe prior intake systems, in which high velocity air flow is separated from lower velocity air in the boundary layer adjacent the aircraft external wetted surface, with the higher velocity air being directed in to the ECS inlet. Such arrangements may increase the performance of the ECS, by increasing the pressure head to the compressor/heat exchanger inlet. Consequently, such an arrangement may reduce fuel burn in an aircraft, by reducing the energy needed to drive the compressor and/or increasing the airflow through the heat exchanger.

ECS systems which instead ingest a portion of the boundary layer close to the engine nacelle or wing have also been suggested in, for example, GB2247510. Such a design may prevent transition of laminar flow air to turbulent flow on the wing or engine nacelle In this case however, the ingested boundary layer air is used inefficiently, providing limited benefits which may not overcome the additional weight and/or complexity of the system.

An alternative method for reducing the fuel burn of an aircraft has been suggested, comprising ingesting air into the main aircraft propulsive engines, then exhausting this at the rear of the aircraft to fill in the wake from the aircraft, thereby reducing drag (see for example "Performance of a Boundary Layer Ingesting (BLI) Propulsion System", published at the 45th AIAA Aerospace Sciences Meeting and Exhibit, 8-11 Jan. 2007, Reno, Nev.). However, such boundary layer ingestion systems may result in an inlet flow distortion penalty on main propulsive engine turbomachinery efficiency (with increased impact if the thrust generated is a large portion of aircraft thrust) which often offsets a large portion of the benefits of BLI.

In the art, the term "boundary layer" is a layer of fluid in the immediate vicinity of a bounding surface where the effects of viscosity are significant. The thickness of the boundary layer is normally defined as the distance from the solid body at which the viscous flow velocity is 99% of the freestream velocity.

The present invention describes an aircraft air duct arrangement which results in increased aircraft performance.

SUMMARY OF THE INVENTION

According to a first aspect of the present invention, there is provided an air duct arrangement for an aircraft, the arrangement comprising;

an environmental control system air inlet arranged to ingest a low velocity portion of a boundary layer flow adjacent an aircraft external surface, and to deliver a flow of air to an environmental control system air intake; and an ejector arranged to receive an environmental control system exhaust and boundary layer air from an aft region of the aircraft, and to exhaust air from an ejector exhaust to the ambient airstream at an aft portion of the aircraft.

Accordingly, air ingested to the ECS system can be utilised to reduce drag, by mixing the re-energised, high pressure air from the ECS exhaust with boundary layer air at the aft of the aircraft, and exhausting this at the rear of the aircraft, thereby reducing aircraft drag as a result of the "wake filling" effect. The invention recognises that the aircraft must be designed as a whole, taking into account the different systems of the aircraft to minimise fuel use.

The environmental control system air inlet may comprise a part annular slot located part way around a circumference of a fuselage of the aircraft. The environmental control system air inlet may be located on an upper surface of the fuselage.

The environmental control system air inlet may be arranged to ingest air from a location upstream of the location at which air is exhausted from the ejector exhaust. The environmental control system air inlet may be arranged to deliver air to one or both of an environmental control system heat exchanger inlet, and an environmental control system air compressor inlet.

The ejector may be located at a different circumferential location to the inlet. For example, the environmental control system air inlet may be located at an upper surface of the fuselage, and the ejector exhaust may be located at a lower surface of the fuselage. Advantageously, a maximum proportion of the boundary layer airflow is re-accelerated by the duct arrangement. Alternatively, the ejector may comprise an annular housing located around a rear portion of the fuselage defining a gap therebetween through which boundary layer air may flow in use. The gap may extend from the aircraft a distance substantially equal to the boundary layer thickness of the air at the ejector in cruise.

The environmental control system air inlet may be arranged to ingest between 10% and 50% of the thickness of the boundary layer airflow adjacent the fuselage at the inlet, and may be arranged to ingest approximately 30% of the thickness of the boundary layer airflow adjacent the fuselage at the inlet. Since the ECS airflow requirement is relatively low, only a small amount of air is required. On the other hand, the majority of the benefit (approximately 80%) in re-accelerating the boundary layer air can be achieved by only re-accelerating the slowest portion of this air (e.g. the 50% of the thickness of the boundary layer closest to the aircraft wetted surface). Consequently, a greater amount of the slowest air can be re-accelerated for a given flow volume, resulting in a large increase in aerodynamic efficiency without a requirement to increase ECS airflow, since the advantage provided by BLI is proportional to the momentum deficit that is restored, and not the total mass flow. Since the boundary layer closest to the aircraft wettest surface has the lowest velocity, a relatively large proportion of the total momentum deficit can be recovered by ingesting this region. In order to better match the ECS air inlet mass flow to the ECS requirements however, it may be desirable for the air inlet to ingest an even smaller proportion of the boundary layer airflow (for example, 30% of the thickness of the boundary layer in cruise). In one example, the environmental control system air inlet is arranged to ingest airflow extending approximately 30 cm or less from the surface of the fuselage.

In one example, the environmental control system air inlet may be sized to ingest between 4 and 5 kilograms of air per second at aircraft cruise conditions. While this exceeds the ECS compressor air requirements of approximately 0.4 to 0.5 Kg/s of airflow for the same aircraft and conditions, the excess air can be used in the heat exchanger.

The air duct arrangement may be arranged to deliver a flow of air to an auxiliary power unit (APU) compressor inlet. The ejector may be arranged to receive an auxiliary power unit exhaust. Advantageously, a larger proportion of the boundary layer can be ingested and re-energised using the APU inlet and exhaust respectively, thereby further increasing the efficiency of the aircraft.

DETAILED DESCRIPTION

Figure 3:
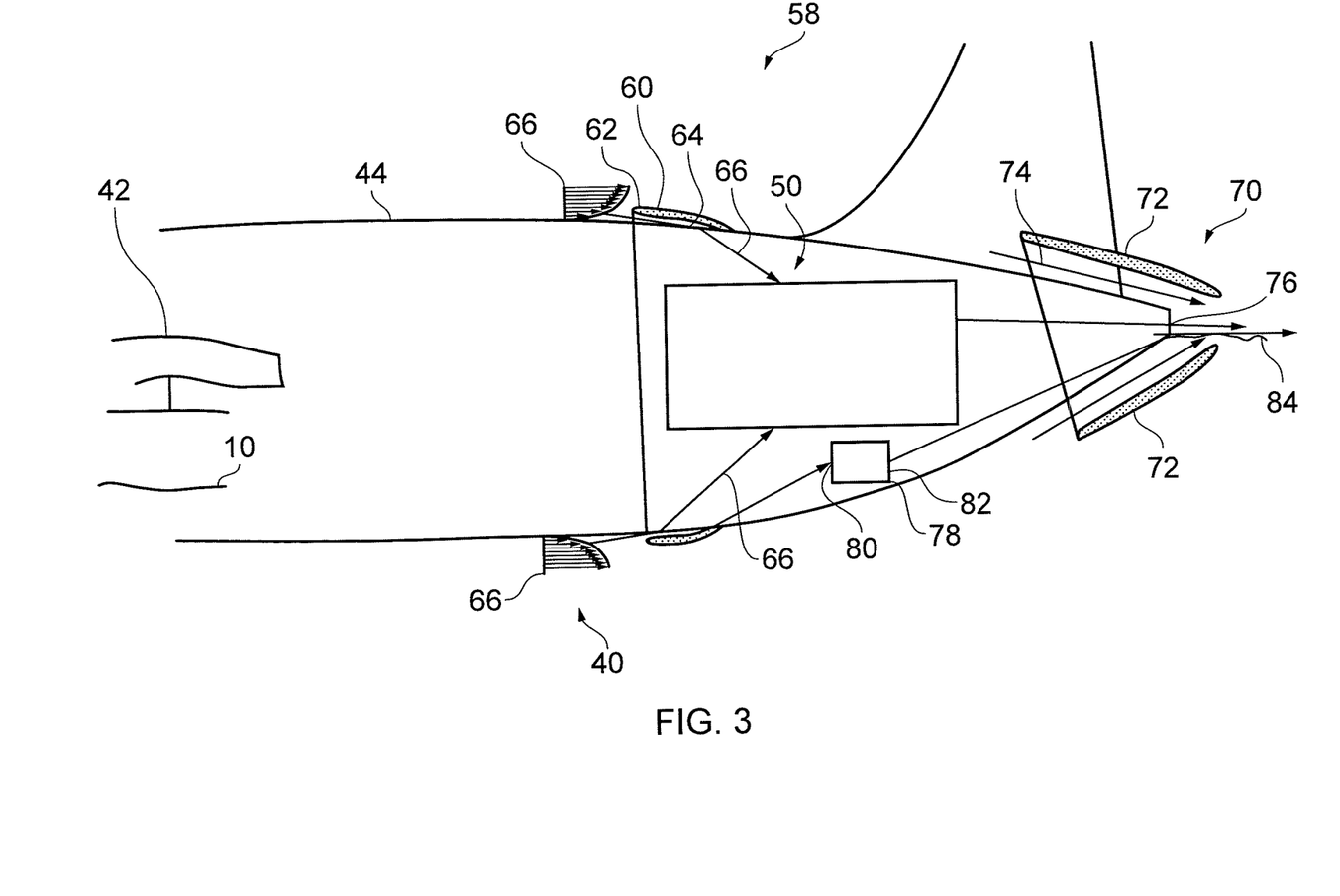
FIG. 3 shows a schematic cross sectional side view of an aircraft having a duct arrangement in accordance with the present disclosure.

FIG. 3 shows an aircraft 40 comprising a pair of wings 42 mounted to a fuselage 44. A pair of wing mounted engines are provided in the form of gas turbine engines 10. An environmental control system (ECS) 50 is provided to provide pressurised air conditioned air to aircraft passengers within the passenger cabin. The aircraft 40 described herein is a passenger aircraft having provision for approximately 100 passengers and two engines 40, though the present disclosure is applicable to other aircraft types and sizes.

Figure 2:
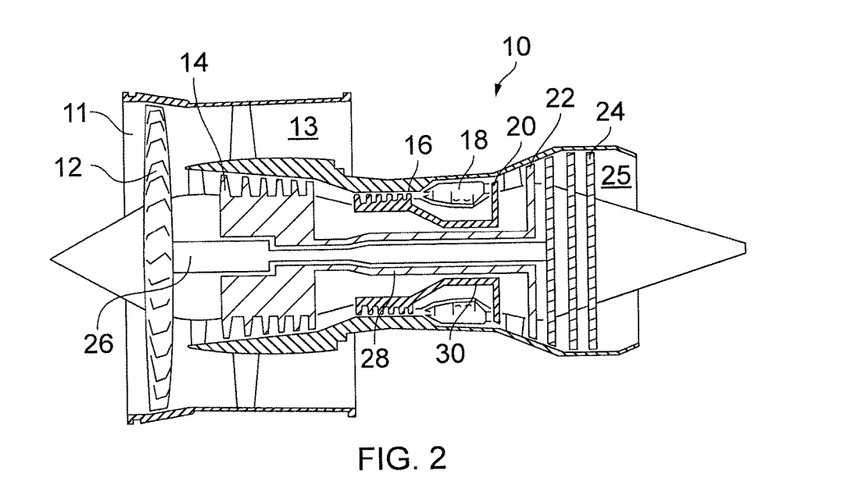
FIG. 2 shows a schematic cross sectional view of a gas turbine engine of an aircraft in accordance with the present disclosure.

FIG. 2 shows one of the engines 10 in more detail. The engine 10 comprises, in axial flow series, an air intake duct 11, an intake fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of gas turbine engine.

Air is drawn through the air intake duct 11 by the intake fan 12 where it is accelerated. A significant portion of the airflow is discharged through the bypass duct 13 generating a corresponding portion of the engine 10 thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 and generates the remaining portion of the engine 10 thrust.

The aircraft 40 comprises an air duct arrangement 58. The air duct arrangement comprises 58 comprises an environmental control system air inlet 60, and an ejector 70.

The inlet 60 comprises a part annular slot 60 extending at least part way around the circumference of the generally cylindrical fuselage 44. The slot 44 comprises a lip 62 extending part way around the fuselage 44 which defines a first gap 64 between the fuselage 44 and lip 62. The first gap 64 extends a distance of approximately 30 cm from the surface of the fuselage 44 skin. The inlet 60 leads to an environmental control system intake duct 66, which delivers ambient air to the ECS 50. The thickness of the first gap 64 and annular extent of the lip 62 are chosen such that the mass-flow requirement of the environmental control system is met, whilst capturing the lowest velocity portion of the boundary air (i.e. the boundary layer air closest to the skin surface). Ideally, the gap 64 is a thin as possible while preventing excessive drag losses from the lip 62 and excessive weight penalties from the relatively large lip 62, which in practice ranges means a gap extending between approximately 10% and 50% of the thickness of the boundary layer in cruise.

The ejector 70 comprises a part annular housing 72 which extends at least part way around the circumference of the fuselage, at a location downstream of the inlet 60. The housing 72 and fuselage 44 define a second gap 74. The second gap 74 extends a distance of approximately 60 cm from the surface of the fuselage 44. A central part of the ejector 70 defines an ECS outlet port 76. The housing 72 extends a distance beyond the outlet port 76 in a direction downstream of the outlet port 76. In use, exhaust gasses from the ECS outlet port 76 are introduced into boundary air flowing through the gap 74. The two flows mix, and the boundary air flowing through the gap 74 is thereby accelerated, before exiting the ejector 70.

During cruise, a boundary layer is formed on the surface of the fuselage 44. The thickness of this boundary layer varies across the length of the fuselage, and also varies in accordance with aircraft conditions such as speed of flight, altitude etc. For given flight conditions, the boundary layer generally reaches a maximum thickness at the aft end of the aircraft 40.

The velocity profile of air within the boundary layer in cruise at the location of the inlet 60 is shown at numeral 66, where shorter arrows represent lower velocities, and longer arrows represent higher velocities. As can be seen, air travelling closer to the fuselage 44 skin surface travels at a lower speed compared to air further from the fuselage 44.

Figure 6:
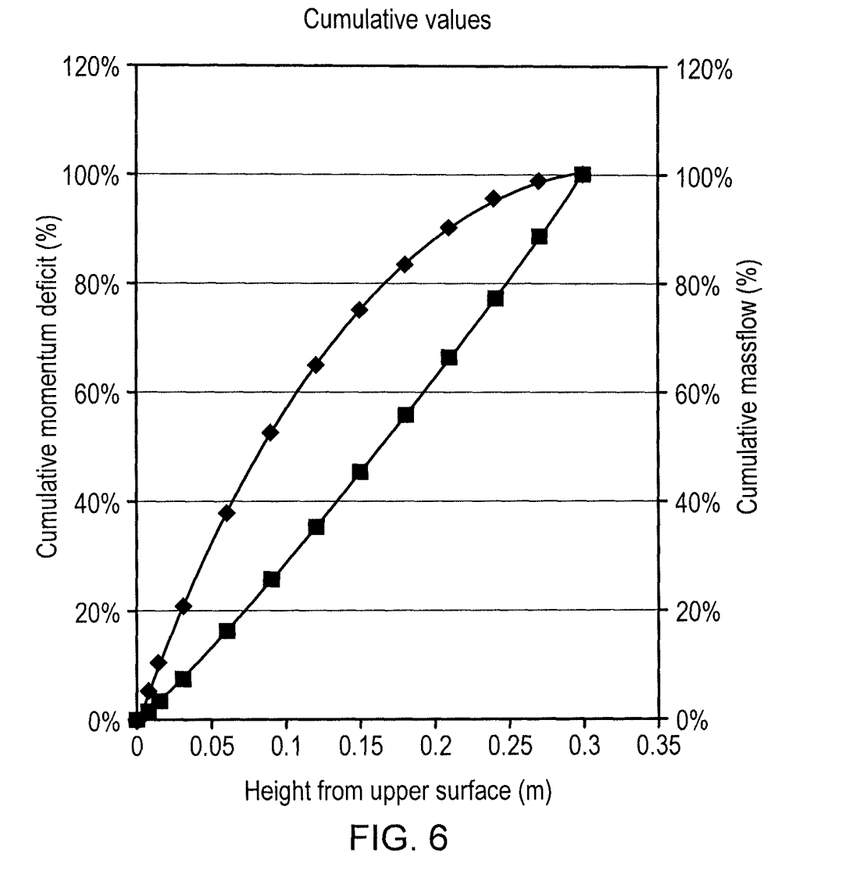
FIG. 6 is a graph showing the relationship between cumulative momentum deficit of airflow travelling over the aircraft of FIG. 3 relative to distance from the fuselage skin.

FIG. 6 shows the variation in the resultant momentum deficit of airflow at the point 66 in FIG. 3 as the distance from the fuselage skin 44 increases. As can be seen, 80% of the cumulative momentum deficit of the airflow is contained within the airflow from 0 to 17 cm (i.e. approximately 50% of the boundary layer thickness) from the fuselage surface 44. Similarly, 90% of the cumulative momentum deficit of the airflow is contained within the airflow from 0 to 21 cm (i.e. approximately 70% of the boundary layer thickness).

Consequently, the lip 62 of the ECS inlet 60 is distanced from the fuselage 44 such that the first gap 64 is approximately 17 cm (i.e. approximately 30% of the boundary layer thickness). Consequently, only the lowest velocity 30% of the boundary layer airflow is ingested into the ECS 50. As a result, the inlet 60 has a relatively large annular extent around the circumference of the fuselage 44.

An optional Auxiliary Power Unit (APU) 78 is also provided. The APU provides electrical power for the aircraft and pressurised air for the ECS 50 while the engine is operated on the ground, and in some instances, while the aircraft is in flight. The APU 78 comprises a gas turbine engine having a compressor, combustor and turbine (not shown) similar to those of the main gas turbine engines 10. A compressor inlet 80 of the APU 78 is supplied with air by the first gap 64, and so receives the low velocity portion of the boundary layer air when operated in flight. The compressed air is combusted in the combustor, used to drive the turbine, then exhausted through a turbine exhaust 82 to the ejector 70 via an APU outlet port 84. The APU exhaust air is therefore mixed with the ECS outlet air and the boundary layer air, thereby accelerating the boundary layer air. Since the APU exhaust air is generally at a higher temperature and pressure than the ECS exhaust air, and generally has a higher mass flow, the momentum imparted to the boundary layer air is considerably higher than when the ejector only ingests ECS outlet air and boundary layer air. Consequently, this arrangement increases the efficiency of the arrangement considerably. Optionally, where the APU is used in flight, the APU could power an electrical motor 63, thereby providing system level efficiencies. Details of this arrangement are given below.

Figure 4:
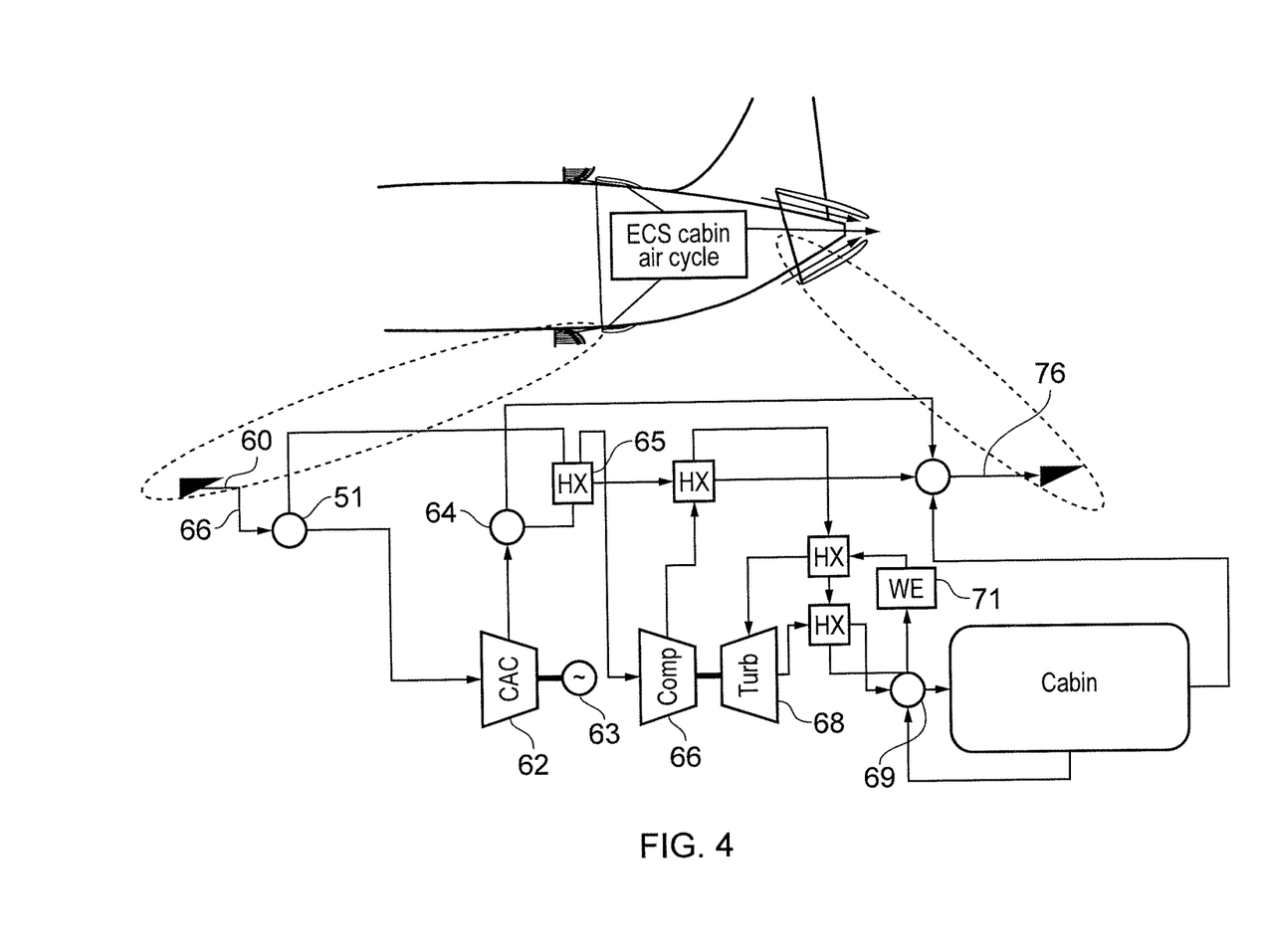
FIG. 4 shows a fluid flow diagram of the duct arrangement of FIG. 3, and an environmental control system in accordance with the present disclosure.

FIG. 4 shows an ECS system 50 for use with the duct arrangement of FIG. 3. The ECS system 50 is a "bleedless" system, in which power for the system is provided by an electrical motor 63 driven by electricity supplied by one or more main engine 10 generators (not shown).

In use, air enters the ECS air inlet 60 and passes through an inlet valve 51, which regulates inlet flow to the downstream components of the ECS 50. A portion of this air is directed through an ECS compressor 62 driven by the electric motor 63, while the remainder is bypassed. The compressed air is directed through a mixer valve 64, where a portion of the compressed air is cooled via a heat exchanger 65. The proportion of air that is compressed or cooled in the heat exchanger 65 is controlled by the mixer valve 64 on the basis of a schedule.

Some of the compressed air is cooled via the heat exchanger 65, which exchanges heat with the bypass air, before being compressed further by an air cycle machine compressor 66. The further compressed air is cooled once more by a second heat exchanger 67 (again by exchanging heat with bypass air), before being expanded in a turbine 68, which provides motive power to drive the air cycle machine compressor 66.

The compressed, temperature controlled air is then pass through a water extraction module 71, before being passed to the cabin. A portion of the cabin air may be recirculated via a recirculation valve 69. Once the air has been used, it is exhausted through the ECS outlet port 76, along with the heated bypass air. The air exhausted at the outlet port 76 has a higher pressure and temperature than the ambient air at cruise (typically around 70 kilo Pascals and 300 Kelvin, compared with ambient air having a typical temperature of around 220 Kelvin and 24 kilo Pascals or less at cruise conditions). This high temperature and pressure air can be converted to high velocity air by a suitable nozzle. The high velocity air from the outlet port 76 is mixed with air entrained in the ejector 70 and exhausted by the ejector 70, as outlined above, thereby reducing the drag on the aircraft 40.

Figure 5:
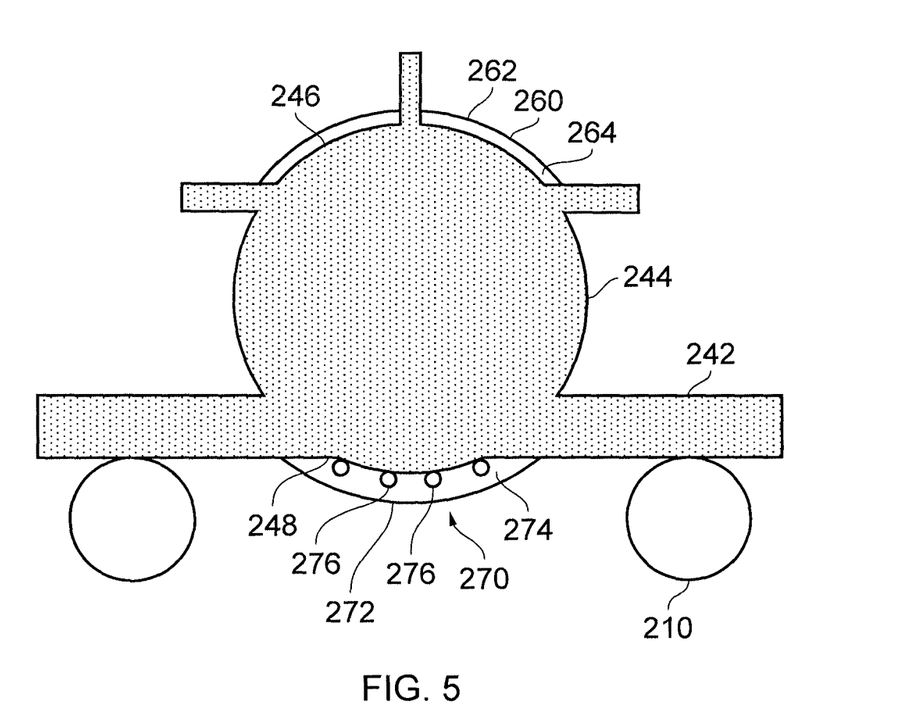
FIG. 5 shows a cross sectional front view of an aircraft having an alternative duct arrangement in accordance with the present disclosure.

FIG. 5 shows an alternative duct arrangement 258 of an aircraft 240. Like reference numerals are used for like features, incremented by 200. The arrangement 258 is similar to that of the first duct arrangement 58, having an ambient air inlet 260 and ejector 270. However, the positioning and circumferential extent of the ambient air inlet 260, and ejector 270.

The ambient air inlet 260 is located on an upper surface 246 of the aircraft fuselage 244. Again, the inlet 260 is in the form of a part annular slot 260, comprising a lip 262, which defines a gap 264 between the fuselage surface 246 and lip 262. The inlet 260 is located toward the aft end of the aircraft 240, similar to the arrangement 58. The ejector 270 could be located downstream of the inlet 260, but need not be.

The ejector 270 is located on a lower surface 248 of the fuselage 244. Again, the ejector comprises a housing 272, which defines a second gap 274 between the housing 272 and lower surface 248. Again, the first gap 264 is narrower than the second gap 274, such that the first gap 264 extends approximately 50% of the thickness of the boundary layer, whereas the second gap 274 extends approximately 100% of the thickness of the boundary layer. A plurality of ECS exhaust ports 274 are provided, which exhaust high pressure, high temperature exhaust gas from the ECS 50 into the ejector flow in the second gap 274. Again therefore, the ejector flow in the second gap 274 is accelerated, thereby reducing aircraft drag.

In this case, since ejector 270 is located at a different circumferential position than the inlet 260, the ejector is capable of ingesting both low velocity portion of the boundary layer air close to the surface of the fuselage 244, and higher energy boundary layer air further from the fuselage 244. This may result in a larger reduction in momentum deficit compared to the arrangement of FIG. 3.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, a different portion of the boundary air could be ingested by the environmental control system ambient air inlet, provided less than 100% of the boundary layer (i.e. a lower velocity portion compared to a portion further from the fuselage surface) is ingested. As a further example, the ECS compressor could be driven using different arrangements. For example, the electrical motor driving the ECS compressor may be supplied with electrical power from an Auxiliary Power Unit (APU) or a dedicated prime mover. Alternatively, the ECS compressor could be directly mechanically driven, either by the main engine, APU or dedicated prime mover. The environmental control system air inlet could be arranged to ingest a low velocity portion of a boundary layer flow adjacent a different surface of the aircraft, such as the wing or engine nacelle.

Aspects of any of the embodiments of the invention could be combined with aspects of other embodiments, where appropriate.

The invention claimed is:

1. An air duct arrangement for an aircraft, the arrangement comprising:
   an environmental control system air inlet arranged to ingest a low velocity portion of a first boundary layer air flow adjacent an aircraft external surface, and to deliver a flow of air to an environmental control system air intake; and
   an ejector arranged to receive an environmental control system exhaust and having an ejector inlet, different from the environmental control system air inlet, arranged to receive a second boundary layer air flow adjacent the aircraft external surface from an aft region of the aircraft, the ejector being further arranged to exhaust air from an ejector exhaust to an ambient airstream at an aft portion of the aircraft,
   wherein the ejector comprises an annular housing extending about a periphery of rear portion of the fuselage and defining a gap between an outer surface of the fuselage and the annular housing through which the second boundary layer air flow may flow in use.

2. The arrangement according to claim 1, wherein the environmental control system air inlet comprises a part annular slot located part way around a circumference of a fuselage of the aircraft.

3. The arrangement according to claim 2, wherein the environmental control system air inlet is located on an upper surface of the fuselage.

4. The arrangement according to claim 1, wherein the environmental control system air inlet is arranged to ingest air from a location upstream of the location at which air is exhausted from the ejector exhaust.

5. The arrangement according to claim 1, wherein the environmental control system air inlet is arranged to deliver air to one or both of an environmental control system heat exchanger inlet, and an environmental control system air compressor inlet.

6. The arrangement according to claim 1, wherein the ejector is located at a different circumferential location to the environmental control system air inlet.

7. The arrangement according to claim 6, wherein the environmental control system air inlet is located at an upper surface of a fuselage, and the ejector exhaust is located at a lower surface of the fuselage.

8. The arrangement according to claim 1, wherein the gap extends from the aircraft a distance substantially equal to the boundary layer thickness of the air at the ejector in cruise.

9. The arrangement according to claim 1, wherein the gap extends from the aircraft a distance extending approximately 80% of the thickness of the boundary layer in cruise at the gap.

10. The arrangement according to claim 9, wherein the environmental control system air inlet is arranged to ingest approximately 30% of the thickness of the boundary layer airflow adjacent the fuselage at the environmental control system air inlet.

11. The arrangement according to claim 1, wherein the environmental control system air inlet is arranged to ingest between 10% and 50% of the thickness of the boundary layer airflow adjacent a fuselage at the environmental control system air inlet.

12. The arrangement according to claim 1, wherein the environmental control system air inlet is sized to ingest between 4 and 5 kilograms of air per second at aircraft cruise conditions.

13. The arrangement according to claim 1 wherein the air duct arrangement is arranged to deliver a flow of air to an auxiliary power unit compressor inlet.

14. The arrangement according to claim 13, wherein the ejector is arranged to receive an auxiliary power unit exhaust.

* * * * *